(12) United States Patent
Kamoi et al.

(10) Patent No.: US 8,038,819 B2
(45) Date of Patent: Oct. 18, 2011

(54) HEAT-RESISTANT RESIN ENDLESS BELT PRODUCING METHOD

(75) Inventors: Sumio Kamoi, Tokyo (JP); Atsushi Takai, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/796,228

(22) Filed: Jun. 8, 2010

(65) Prior Publication Data

US 2010/0314039 A1  Dec. 16, 2010

(30) Foreign Application Priority Data

Jun. 16, 2009  (JP) ................. 2009-143295

(51) Int. Cl.
*B32B 37/12* (2006.01)
(52) U.S. Cl. ........................... 156/159; 156/157
(58) Field of Classification Search .......... 156/157, 156/159
See application file for complete search history.

(56) References Cited

U.S. PATENT DOCUMENTS 7,459,203 B2 * 12/2008 Pickering ................ 428/212
2004/0120739 A1 * 6/2004 Chen et al. ............... 399/329

FOREIGN PATENT DOCUMENTS

| JP | 10-698 | 1/1998 |
| JP | 11-291348 | 10/1999 |
| JP | 3411091 | 3/2003 |
| JP | 2007-247671 | 9/2007 |

* cited by examiner

*Primary Examiner* — Mark A Osele
*Assistant Examiner* — Nickolas Harm
(74) *Attorney, Agent, or Firm* — Cooper & Dunham LLP

(57) ABSTRACT

A method for producing a heat-resistant resin endless belt includes preparing a heat-resistant resin sheet including a first surface and a second surface opposite to each other; forming a first inclined thinned portion at an end of the first surface and a second inclined thinned portion at an end of the second surface as the inclined thinned portion is formed to be gradually thinned toward the end, the end of the first surface being opposite to the end of the second surface; applying an adhesive composition by a screen printing method on at least one of the first and second inclined thinned portions; joining the first and second inclined thinned portions of the sheet to each other; and hardening the adhesive composition, in which the adhesive composition is an additive polymerized silicon adhesive composition containing ferric (III) oxide at between 6.5 and 9.9 weight % of a solid content of the adhesive composition; a viscosity of the additive polymerized silicon adhesive composition before being hardened at 23° C. is between 50 and 100 Pa s; and an expanding rate at shearing of the adhesive composition after being hardened is 250% or more on a tensile shear test.

3 Claims, 1 Drawing Sheet

HEAT-RESISTANT RESIN ENDLESS BELT PRODUCING METHOD

CROSS REFERENCE TO RELATED APPLICATION

The present application is based on and claims priority from Japanese Patent Application No. 2009-143295, filed on Jun. 16, 2009, the disclosure of which is hereby incorporated by reference in its entirety.

BACKGROUND

1. Technical Field

This disclosure relates to a method for producing a heat-resistant endless belt used as an intermediate transfer belt, a fixing belt, a paper conveying belt, or a paper drying belt which is used for an electrophotographic device such as a copier, a laser beam printer, a facsimile, or an ink jet printer.

2. Description of the Related Art

High pressure affects the paper conveying belt, the intermediate transfer belt, or the like among the heat-resistant endless belts used for the electrophotographic device. Also, high pressure and high temperature affect the fixing belt. Therefore, high heat-resistance and high mechanical strength are required of the heat-resistant endless belts used for the electrophotographic device. For those reasons, a polyimide resin has been used for a material to compose the heat-resistant endless belts. Japanese Patent No. 3411091 discloses a technique to produce a heat-resistant endless belt out of polyimide resin in which a polyimide endless belt is produced by heating polyimide varnish to imidize, after cast-forming polyimide varnish on a surface of an outer circumference of a metallic cylindrical body, for example.

However, there is a problem in Japanese Patent No. 3411091 in that a number of molds are necessary because an imidizing process takes a long time and the cost of molds is high; also, a high initial cost is required because a new mold is necessary every time a size gauge of the mold is changed.

Further, Japanese Patent Application Publication No. Hei11-291348 discloses a technique to produce a polyimide endless belt by processing an inexpensive polyimide sheet, for example.

Japanese Patent Application Publication No. Hei11-291348 shows that the polyimide endless belt is obtained by adhering a non-thermoplastic polyimide film and a thermal plastic polyimide resin together and melt-bonding the thermal plastic polyimide resin.

However, there is a problem in Japanese Patent Application Publication No. Hei11-291348 in that it is difficult to make uniform the layer thicknesses and stiffness between a melt-bonded joint and a non-joint, and also to bond without losing smoothness. As a result, a defective streaky line appears on a fixed image caused by the joint of such a belt, for example.

Furthermore, Japanese Patent Application Publication No. Hei10-000698 discloses a technique to produce a polyimide endless belt by forming groove shaped concavoconvex portions on each of surfaces of end portions of a heat hardening resin sheet or the like and joining the concavoconvex portions fitting each other.

Japanese Patent Application Publication No. Hei10-000698 exemplifies 1) silicon elastic adhesive, 2) urethane elastic adhesive, 3) hot-melt type silicon adhesive, 4) silane-altered polyimide adhesive, and 5) epoxy adhesive as an adhesive applied to the technique, where the adhesive may be used by itself or combined in order to strongly join a polyimide sheet so that the joined sheet can be applied to an intermediate transfer belt.

However, there is a problem in making a fixing belt from the polyimide endless belt in that a silicon elastic layer or a fluorine resin separation layer is formed on the surface of the polyimide endless belt. Here, because the temperature is as high as 300 to 350° C. when forming the fluorine resin separation layer, the adhesive of the joined portion is deteriorated by the heat. Therefore, the adhesive strength is deteriorated.

Here, there is a problem in that an upper temperature limit of a general adhesive of the above described 1) to 3) is 190° C. or less. Therefore, the adhesive strength is deteriorated when the adhesive is heated at 300 to 350° C. to form the fluorine resin separation layer. Another problem is that the adhesive is stiff after being hardened even though the heat-resistance is good; therefore, a defective streaky line appears on a toner-fixed image of a corresponding part of the joined part of the polyimide endless belt.

BRIEF SUMMARY

In an aspect of this disclosure, there is provided a method for producing a heat-resistant resin belt which can prevent deterioration of an adhesive strength even when the adhesive composition is heated at a temperature of 300 to 350° C. to form a fluorine resin layer, as well as to provide a method for producing a heat-resistant resin belt of which the strength of the joint at 190° C., the operation temperature at fixing, is higher (fulfilling a required strength as a belt) than that of a sheet itself, and also to provide a method to prevent negative effects on an image caused by the joint when the belt is applied to an image forming apparatus.

In another aspect, a method for producing a heat-resistant resin endless belt includes preparing a heat-resistant resin sheet including a first surface and a second surface opposite to each other; forming a first inclined thinned portion at an end of the first surface and a second inclined thinned portion at an end of the second surface as the inclined thinned portion is formed to be gradually thinned toward the end, the end of the first surface being opposite to the end of the second surface; applying an adhesive composition by a screen printing method on at least one of the first and second inclined thinned portions; joining the first and second inclined thinned portions of the sheet to each other; and hardening the adhesive composition, in which the adhesive composition is an additive polymerized silicon adhesive composition containing ferric (III) oxide at between 6.5 and 9.9 weight % of a solid content of the adhesive composition; a viscosity of the additive polymerized silicon adhesive composition before being hardened at 23° C. is between 50 and 100 Pa s; and an expanding rate at shearing of the adhesive composition after being hardened is 250% or more on a tensile shear test.

BRIEF DESCRIPTION OF THE DRAWINGS

The present invention will be described below with reference to the following description of an exemplary embodiment and the accompanying drawings in which.

DETAILED DESCRIPTION OF THE PREFERRED EMBODIMENTS

Hereinafter, a method for producing a heat-resistant resin belt according to a preferred embodiment of the present invention will be described in detail with reference to FIGS. 1A to 1E.

The method for producing a heat-resistant resin belt according to an embodiment of the present invention includes preparing a heat-resistant resin sheet α including a first surface and a second surface opposite to each other, forming a first thinned portion α2 at an end of the first surface and a second thinned portion α2 at an end of the second surface, the end of the first surface being opposite to the end of the second surface, applying an adhesive composition β on at least one of the first and second thinned portions α2, joining the first and second thinned portions to each other, and hardening the adhesive composition. The adhesive composition is a silicon adhesive composition containing ferric (III) oxide at between 6.5 and 9.9 weight % of a solid content of the adhesive composition. The viscosity of the silicon adhesive composition at 23° C. before being hardened is between 50 and 100 Pa s. An expanding rate of the adhesive composition is 250% or more on a tensile shear test conducted after the adhesive composition is hardened.

A heat-resistant resin which forms the heat-resistant resin sheet in the embodiment of the present invention may be polyimide, polyamide-imide, polyetheretherketone, polyphenylene sulfide, and polycarbonate, etc. Among those, polyimide resin is preferably used, so that an endless belt having remarkable thermal stability and mechanical strength properties can be offered.

The thickness of the heat-resistant resin sheet may be, for example, between 50 μm or more and 125 μm or less. The thickness is appropriately determined taking into consideration the necessary strength (endurance) and elasticity.

Each of the first and second thinned portions may have an inclined surface. The thinned portion is formed to be gradually thinned toward the end.

Figure 1A:
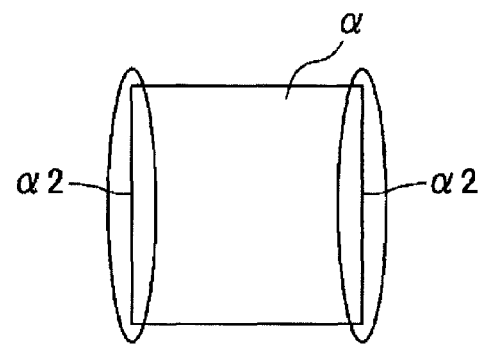
FIG. 1A is a schematic top view of a heat-resistant resin sheet α in a rectangular shape.
Figure 1B:
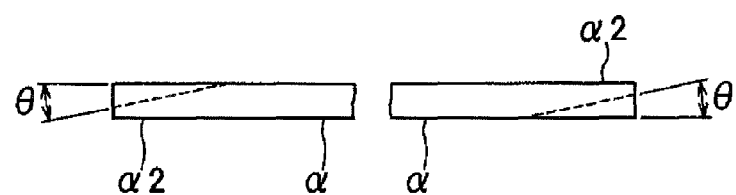
FIG. 1B is a schematic side view of the heat-resistant resin sheet.
Figure 1C:
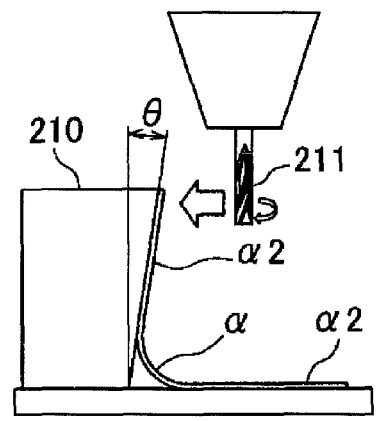
FIG. 1C illustrates a method to form an inclined thinned portion.
Figure 1D:
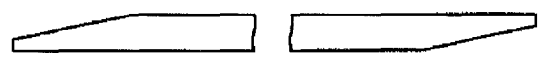
FIG. 1D is a schematic side view of the inclined thinned portion formed on the heat-resistant resin sheet.

After preparing the heat-resistant resin sheet a including the first surface and the second surface opposite to each other, the inclined thinned portion is formed at each end α2 of both the first and second surfaces, wherein the end α2 of the first surface is opposite to the end α2 of the second surface. FIG. 1A is a schematic top view of the heat-resistant resin sheet a in a rectangular shape. FIG. 1B is a schematic side view of the heat-resistant resin sheet. As shown in FIG. 1C, the inclined thinned portion is formed by cutting work using a jig 210 which slantingly holds the heat-resistant resin sheet a against a drill 211 of a milling machine and a working surface thereof. For example, FIG. 1D shows a schematic side view of the inclined thinned portion. Here, suppose a tip end of the inclined thinned portion is shaped to be between 15 to 30 μm in thickness, the tip end of the heat-resistant resin sheet would not chip off during cutting work and subsequent processes. As a result, a larger yield and a stable mass production can be achieved.

By using the milling machine as described above, expensive equipment such as a laser is unnecessary, so the equipment cost is lowered.

The adhesive composition may be an additive polymerized silicon. In the embodiment of the present invention, the adhesive composition is the additive polymerized silicon adhesive composition containing ferric (III) oxide at between 6.5 and 9.9 weight % of the solid content of the adhesive composition. The viscosity of the additive polymerized silicon adhesive composition before being hardened is between 50 and 100 Pa s at 23° C. The expanding rate of the adhesive composition is 250% or more on the tensile shear test after the adhesive composition is hardened.

In the present embodiment, ferric (III) oxide is contained at between 6.5 and 9.9 weight % of the solid content of the adhesive composition; more specifically, ferric (III) oxide is contained at between 6.5 and 9.9 weight % of the solid content of the additive polymerized silicon adhesive composition excluding a solvent from the adhesive composition.

Here, ferric (III) oxide is in powder form. A particle diameter is preferably between 10 nm and 1000 nm. As such a ferric (III) oxide powder, a colcothar is commercially available. If the particle diameter is less than 10 nm, the viscosity greatly increases when the powder is mixed, so that a sufficient quantity of the powder cannot be compounded. On the other hand, if the particle diameter is more than 1000 nm, the thickness of a joined portion tends to considerably vary when handling a thin joined portion.

By compounding such a ferric (III) oxide, heat deterioration of a silicone compound, that is, a component of the adhesive composition can be prevented.

The adhesive composition may be applied by a screen printing method. The ferric (III) oxide is compounded to be within between 6.5 and 9.9 weight %, for example, by a three-roll mill. If the compounded amount is less than 6.5 weight %, sufficient heat-resistance cannot be obtained. On the other hand, if the compounded amount is more than 9.9 weight %, cracks are prone to occur at screen printing, hereupon, an uneven thickness of the adhesive layer is prone to arise. Thereby the predetermined adhesive strength may not be obtained.

Here, the compounding amount of the ferric (III) oxide can be adjusted by compounding appropriate quantities of the additive polymerized silicone adhesive composition containing no ferric (III) oxide with the additive polymerized silicone adhesive composition containing the ferric (III) oxide.

As the adhesive composition used in the method for producing a heat-resistant resin belt according to an embodiment of the present invention, the additive polymerized silicone adhesive composition is preferably used as described above. That is, the additive polymerized silicone adhesive composition has elasticity even after being hardened, so that the adhesive composition at the joint of the thinned portions does not become stiff. For this reason, there are no negative effects on an image when the heat-resistant resin belt is used as a fixing belt or h like. Also, a long pot life and easy handling are achieved.

Further, it is necessary that the viscosity of the adhesive composition used in an embodiment of the present invention be between 50 pa s and 100 pa s at 23° C. Due to such a composition, the screen printing method can be used to evenly and thinly apply the adhesive composition; therefore a highly strong joint can be obtained. Also, the adhesive composition is not excessively applied; therefore, the adhesive composition extruding out of the joint of thinned portions is minimally suppressed; accordingly, a burr by the hardened adhesive composition is prevented from arising, as a result, a burr removal process is unnecessary. Moreover, the joint is prevented from being unnecessarily stiff, and therefore the negative effects on an image are prevented in advance when the heat-resistant resin belt is used as the fixing belt or the like. Such an adhesive composition can be appropriately selected from commercial products; otherwise, the viscosity of the adhesive composition can be adjusted to the required degree by compounding some additive polymerized adhesive compositions or by necessarily adding a solvent.

It is necessary that the expanding rate of the adhesive composition used in an embodiment of the present invention be 250% or more on the tensile shear test after the adhesive composition is hardened. So as to prepare such an adhesive composition, the additive polymerized silicone adhesive composition is appropriately chosen for a base. The expanding rate is an amount measured on the tensile shear test complying with JIS K 6249. If the expanding rate is less than 250%, a sufficient joint strength cannot be obtained. The additive polymerized silicone adhesive composition having such an expanding rate can be obtained by: choosing from a commercial additive polymerized silicone adhesive composition or combining the additive polymerized silicone adhesive compositions each having different expanding rates then adjusting the expanding rate.

As described above, since the adhesive composition is the additive polymerized silicon adhesive composition which contains ferric (III) oxide between 6.5 and 9.9 weight %, the viscosity of the adhesive composition before being hardened is between 50 pa s and 100 pa s at 23° C.; and since the expanding rate of the adhesive composition after being hardened is 250% or more on the tensile shear test, the adhesive strength does not deteriorate so much even when the adhesive composition is heated at a temperature of 300 to 350° C. to form a fluorine resin layer; also, the joint strength is higher than that of the polyimide sheet itself (whose thickness is correspondent to the required strength) even at a temperature of 190° C., which is an operation temperature at fixing; moreover, a heat-resistant endless belt can be obtained in which there are no negative effects caused by the joint on an image when the belt is applied to an image forming apparatus.

Figure 1E:
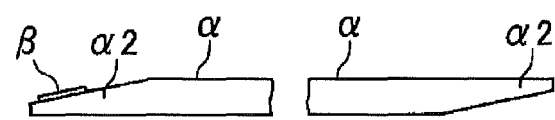
FIG. 1E illustrates the adhesive composition β being applied on an inclined surface of the heat-resistant resin sheet α.

The screen printing method is used to apply the adhesive composition. This makes it possible for the adhesive composition to be evenly and precisely applied in terms of thickness to the desired parts. As a result, the negative effects caused by the joint can be prevented in advance when the heat-resistant resin belt is used for the image forming apparatus. The adhesive composition is applied on at least one surface of the inclined thinned portions. FIG. 1E shows a schematic view of the adhesive composition β being applied on the inclined surface of the heat-resistant resin sheet α.

After the adhesive composition is applied, the surfaces of the inclined thinned portions are overlapped with each other. Then, a hardening process is conducted in an appropriate way depending on the applied adhesive composition. For example, the overlapped part is kept at a necessary temperature for a required time, whilst pressuring the overlapped part at the most appropriate pressure.

Furthermore, the method for producing a heat-resistant resin belt may include forming an elastic layer made of a conductive silicon rubber and a separation layer made of a fluorine resin on an outer surface of the joined heat-resistant resin sheet sequentially. The heat-resistant endless belt obtained as described above can be used as an intermediate transfer belt or fixing belt which can be used for an image forming apparatus by sequentially forming an elastic layer made of a conductive silicon rubber and a separation layer made of a fluorine resin on the outer surface.

EXAMPLES

Preparing a Silicon Adhesive Composition

A total of 20 types of adhesive compositions (embodiments 1 to 7, comparative examples 1 to 13) were obtained by combining materials shown in Table 1. Two materials were combined by the weight ratios shown in Table 2 by using a revolving mixer which rotates itself. Then, a decompression defoaming treatment was conducted.

X32-2180(A/B) (compounding ferric oxide) of Shin-Etsu Chemical Co., Ltd., TSE3261-G (compounding ferric oxide) of Momentive Performance Materials Inc., and TSE326 (compounding ferric oxide) of Momentive Performance Materials Inc. shown in Table 1 are all additive polymerized silicon adhesive compositions. All of the above adhesive compositions contain powdered ferric (III) oxide.

TABLE 1

| Adhesive | Material (Additive polymerized silicon adhesive composition) | Amount of ferric oxide (III) Compounded |
|---|---|---|
| A | X32-2180(A/B)(compounding ferric oxide) of Shin-Etsu Chemical Co., Ltd. | 10 weight % |
| B | TSE3261-G (compounding ferric oxide) of Momentive Performance Materials Inc. | 10 weight % |
| C | TSE326 (compounding ferric oxide) of Momentive Performance Materials Inc. | 10 weight % |
| D | SE-1701 of Dow Corning Toray Co., Ltd, | — |
| E | SE-1714 of Dow Corning Toray Co., Ltd. | — |
| F | X-93-405 of Shin-Etsu Chemical Co., Ltd. | — |
| G | KE-1800 of Shin-Etsu Chemical Co., Ltd. | — |
| H | KE-1830 of Shin-Etsu Chemical Co., Ltd. | — |
| I | KE-1802 of Shin-Etsu Chemical Co., Ltd. | — |

TABLE 2

| | First composition (Containing ferric oxide) | | Second composition (Not containing ferric oxide) | | Amount of ferric oxide |
|---|---|---|---|---|---|
| | Adhesive | Compounded amount | Adhesive | Compounded amount | Compounded in weight % |
| Embodiment 1 | A | 65 | D | 35 | 6.5 |
| Embodiment 2 | A | 80 | D | 20 | 8 |
| Embodiment 3 | A | 90 | D | 10 | 9 |
| Embodiment 4 | A | 99 | F | 1 | 9.9 |
| Embodiment 5 | A | 90 | G | 10 | 9 |
| Embodiment 6 | A | 80 | H | 20 | 8 |
| Embodiment 7 | A | 65 | H | 35 | 6.5 |
| Comparative example 1 | A | 60 | D | 40 | 6 |
| Comparative example 2 | A | 50 | D | 50 | 5 |
| Comparative example 3 | A | 20 | D | 80 | 2 |
| Comparative example 4 | A | 60 | H | 40 | 6 |

TABLE 2-continued

|  | First composition (Containing ferric oxide) | | Second composition (Not containing ferric oxide) | | Amount of ferric oxide |
|---|---|---|---|---|---|
|  | Adhesive | Compounded amount | Adhesive | Compounded amount | Compounded in weight % |
| Comparative example 5 | A | 50 | H | 50 | 5 |
| Comparative example 6 | A | 60 | G | 40 | 6 |
| Comparative example 7 | B | 80 | D | 20 | 8 |
| Comparative example 8 | C | 80 | D | 20 | 8 |
| Comparative example 9 | — | — | D | 100 | 0 |
| Comparative example 10 | — | — | E | 100 | 0 |
| Comparative example 11 | — | — | G | 100 | 0 |
| Comparative example 12 | — | — | H | 100 | 0 |
| Comparative example 13 | — | — | I | 100 | 0 |

A viscosity at 23° C., an expanding rate at shearing on a tensile shear test after hardening, a screen printing performance, and tensile shear strength of the 20 types of the adhesive compositions were evaluated respectively.

<Viscosity at 23° C.>

The viscosity at 23° C. of the adhesive composition (hereinafter viscosity) was measured by a B-type Rotational viscometer.

<Expanding Rate at Shearing of the Adhesive Composition on a Tensile Shear Test after Hardening>

Each expanding rate at shearing of the adhesive compositions on the tensile shear tests after hardening (hardening condition: at 150° C. for 1 hour) was measured complying with JIS K 6249. The results are shown in Table 3.

<Evaluation of a Screen Printing Performance>

An adhesive composition was applied by a screen printing method, using a stainless steel mesh of 400 mesh calendar type (having a mesh thickness of 44 μm), on a polyimide film: UPILEX®125S of UBE INDUSTRIES, LTD. having the thickness of 125 μm. The thickness of the adhesive composition was between 10 and 12 μm in a pattern having dimensions of 5 mm×400 mm.

An incidence of cracks and blurs was visually checked, and an incidence of thickness unevenness was inspected by a micrometer. In Table 3, "○," that is, "sufficiently good" indicates that neither cracks nor blurs were found; therefore, a continuous printing was possible. On the other hand, "x," that is, "insufficient" indicates that cracks and blurs were found; therefore thickness unevenness occurred, that is, a distribution of the thickness measured by the micrometer was 20% or less.

<Tensile Shear Strength>

A polyimide resin sheet (UPILEX®125S of UBE INDUSTRIES, LTD.) having a thickness of 125 μm and dimensions of 447 mm×400 mm was prepared. The sheet was cut and shaped such that the cut width was 5 mm on the longer end portions of the opposing surfaces and the sheet was gradually thinned toward the ends so inclined surfaces were formed, making the thickness of the tip ends between 19 and 22 μm. The adhesive composition was applied on both of the inclined surfaces by the screen printing method such that each thickness of the adhesive composition layers was between 10 and 12 μm. The inclined surfaces were overlapped with each other, and the overlapped part was heated and pressured at 130° C. for 3 minutes by a heating pressure bar, A heat treatment was performed at 250° C. for 30 minutes without pressure. Accordingly, the adhesive composition was completely hardened and a belt was obtained.

Next, the belt was cut in a width of 20 mm, and a tensile strength of the joint was measured complying with JIS K 6249. Table 3 shows the comparative results of the tensile strength between the joint and the other part which does not include the joint. "x (insufficient)" indicates that the tensile strength of the joint was less than 50% of that of the other part. "x" also indicates that peeled fractures that occurred at shearing were found upon observing the fractured surface using an optical microscope at 20 to 50 times power. "○ (sufficiently good)" indicates what the above does not apply. This tensile shear test was performed at room temperature, and at 190° C. (assuming this to be the required heat-resistant durability of the fixing belt for an image forming apparatus to which the heat-resistant resin belt of the present invention is applied).

The results of the measurements and the evaluations are shown in Table 3.

TABLE 3

| Adhesive composition | Viscosity (Pa/s) | Expanding rate (%) | Screen printing performance | Tensile shear strength | | Paper carrying tests on an actual machine |
|---|---|---|---|---|---|---|
|  |  |  |  | Room temperature | 190° C. |  |
| Embodiment 1 | 96 | 252 | ○ | ○ | ○ | ○ |
| Embodiment 2 | 100 | 264 | ○ | ○ | ○ | ○ |
| Embodiment 3 | 103 | 272 | ○ | ○ | ○ | ○ |
| Embodiment 4 | 105 | 286 | ○ | ○ | ○ | ○ |
| Embodiment 5 | 126 | 312 | ○ | ○ | ○ | ○ |
| Embodiment 6 | 98 | 284 | ○ | ○ | ○ | ○ |
| Embodiment 7 | 107 | 287 | ○ | ○ | ○ | ○ |
| Comparative example 1 | 95 | 248 | ○ | ○ | X | Unadministered |
| Comparative example 2 | 91 | 240 | ○ | ○ | X | Unadministered |
| Comparative example 3 | 82 | 216 | ○ | ○ | X | Unadministered |
| Comparative example 4 | 105 | 288 | ○ | ○ | X | Unadministered |
| Comparative example 5 | 106 | 290 | ○ | ○ | X | Unadministered |
| Comparative example 6 | 180 | 408 | X | ○ | X | Unadministered |

TABLE 3-continued

| Adhesive composition | Viscosity (Pa/s) | Expanding rate (%) | Screen printing performance | Tensile shear strength Room temperature | 190° C. | Paper carrying tests on an actual machine |
|---|---|---|---|---|---|---|
| Comparative example 7 | 53 | 168 | ○ | X | X | Unadministered |
| Comparative example 8 | 40 | 176 | X | X | X | Unadministered |
| Comparative example 9 | 77 | 200 | ○ | ○ | X | Unadministered |
| Comparative example 10 | 68 | 250 | ○ | ○ | X | Unadministered |
| Comparative example 11 | 304 | 530 | X | ○ | X | Unadministered |
| Comparative example 12 | 102 | 300 | ○ | ○ | X | Unadministered |
| Comparative example 13 | 330 | 560 | X | ○ | X | Unadministered |

Table 3 shows that the method of the present invention can offer a heat-resistant resin belt having an excellent screen printing performance and a remarkably heat-resistant and strong joint at room temperature and even at 190° C.

<Evaluation as a Fixing Belt>

A polyimide sheet (UPILEX®125S of UBE INDUSTRIES, LTD.) having a thickness of 125 μm and dimensions of 448.5 mm×400 mm was prepared. The sheet was cut and shaped such that a cut width was 7 mm on the longer end portions of the opposing surfaces and the sheet was gradually thinned toward the ends so inclined surfaces were formed. Here, the thickness of the tip ends was 19 to 22 μm. Each of the adhesive compositions of the embodiments 1 to 7 out of the adhesive compositions compounded as described above was applied on both of the entire cut-worked inclined surfaces by the screen printing method such that each thickness of the adhesive composition layers was between 10 and 12 μm.

Next, the sheet was sucked by a mandrel core having a diameter of 140.5 mm and a number of suction holes sorbing and twisting around the mandrel core. Then, the inclined surfaces were overlapped with each other (the joint). The primary hardening was performed by heating and pressuring the joint at 130° C. for 3 minutes. After that, a mandrel made of aluminum having an outer diameter of 139.4 mm was inserted into the polyimide belt joined as described above; then, the belt was heated at 250° C. for 30 minutes so the adhesive composition was completely hardened. Therefore, the 7 types of the heat-resistant resin belts in the embodiments of the present invention were obtained. Finally, the extruded adhesive compositions were removed from the entire joint surface within 20 mm around the joint by pressing a broom-like brush made of bound bamboo sticks having a diameter of 0.5 to 0.8 mm against the surfaces rotating the brush at 50 rmp.

Next, on the surface of the 7 types of the heat-resistant resin belts, a silicone resin solution was sprayed to form a coating film; then, a silicone elastic layer having a thickness of 205 μm was formed by heating at a temperature of 150° C. for 2 hours.

Further, a surface modification was made by performing a corona discharge treatment on the surface of the silicone elastic layer; then, a coating film was formed on the surface by performing a spray coating of water dispersions of PFA (perfluoroalkoxyethylene); in addition, a separation layer having a thickness of 20 μm was formed on the surface by a heating process at 340° C. for 20 minutes. Accordingly, heat-resistant fixing belts having an inner diameter of 140 mm (as the fixing belt for an image forming apparatus) were obtained.

On an appearance inspection of the fixing belts, no abnormalities were found. Also, an image forming test (paper carrying test on an actual machine) was performed by applying the fixing belts on the actual image forming apparatus. In Table 3, "o," that is, "sufficiently good" indicates that no negative effects caused by the joint were found on the tests.

According to the method for producing the heat-resistant resin belt of the present embodiment, the adhesive composition was the additive polymerized silicon adhesive composition which contained ferric (III) oxide at between 6.5 and 9.9 weight % of the solid content. The viscosity of the adhesive composition before being hardened was between 50 pa s and 100 pa s at a temperature of 23° C. The expanding rate of the adhesive composition after being hardened was 250% or more on the tensile shear test. By using the adhesive composition composed as described above, the deterioration of the adhesive strength caused by the adhesive composition could be prevented even when the adhesive composition was heated at a temperature of 300 to 350° C. to form a fluorine resin layer. Also, even at a temperature of 190° C., which is an operation temperature of the fixing belt, the joint was stronger than the polyimide sheet itself. Moreover, there were no negative effects on an image caused by the joint, when applied to an image forming apparatus as a heat-resistant endless belt.

Furthermore, according to the method for producing the heat-resistant resin belt of the present embodiment, an excellent fixing belt be obtained for an image forming apparatus.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A method for producing a heat-resistant resin endless belt, comprising the steps of:
   preparing a heat-resistant resin sheet including a first surface and a second surface opposite to each other;
   forming a first inclined thinned portion at an end of the first surface and a second inclined thinned portion at an end of the second surface, the first inclined thinned portion and the second inclined thinned portion being tapered toward the end of the first surface and the end of the second surface, respectively, the end of the first surface being opposite to the end of the second surface;
   obtaining an adhesive composition wherein an additive polymerized silicon adhesive composition containing ferric (III) oxide in powder form is compounded with an additive polymerized silicon adhesive composition containing no ferric (III) oxide such that the ferric (III) oxide is between 6.5 and 9.9 weight % of a solid content of the obtained adhesive composition;

applying the adhesive composition by a screen printing method on at least one of the first and second inclined thinned portions;
joining the first and second inclined thinned portions of the sheet to each other; and
hardening the adhesive composition, wherein
a viscosity of the additive polymerized silicon adhesive composition before being hardened at 23° C. is between 50 and 100 Pa s; and
an expanding rate at shearing of the adhesive composition after being hardened is 250% or more on a tensile shear test.

2. The method according to claim 1, further comprising forming an elastic layer made of a conductive silicon rubber and a separation layer made of a fluorine resin on an outer surface of the joined heat-resistant resin sheet sequentially.

3. The method according to claim 1, wherein
the ferric (III) oxide in the adhesive composition is in powder form having a diameter in a range of 10 nm to 100 nm.

* * * * *